May 28, 1946.   H. L. MILNER   2,400,942
AERODYNAMIC BALANCING OF AIRSCREWS OR LIKE ROTATING BODIES
Filed Oct. 31, 1942   3 Sheets-Sheet 1

Inventor
Harry L. Milner
by
Wilkinson & Mawhinney
Attorneys

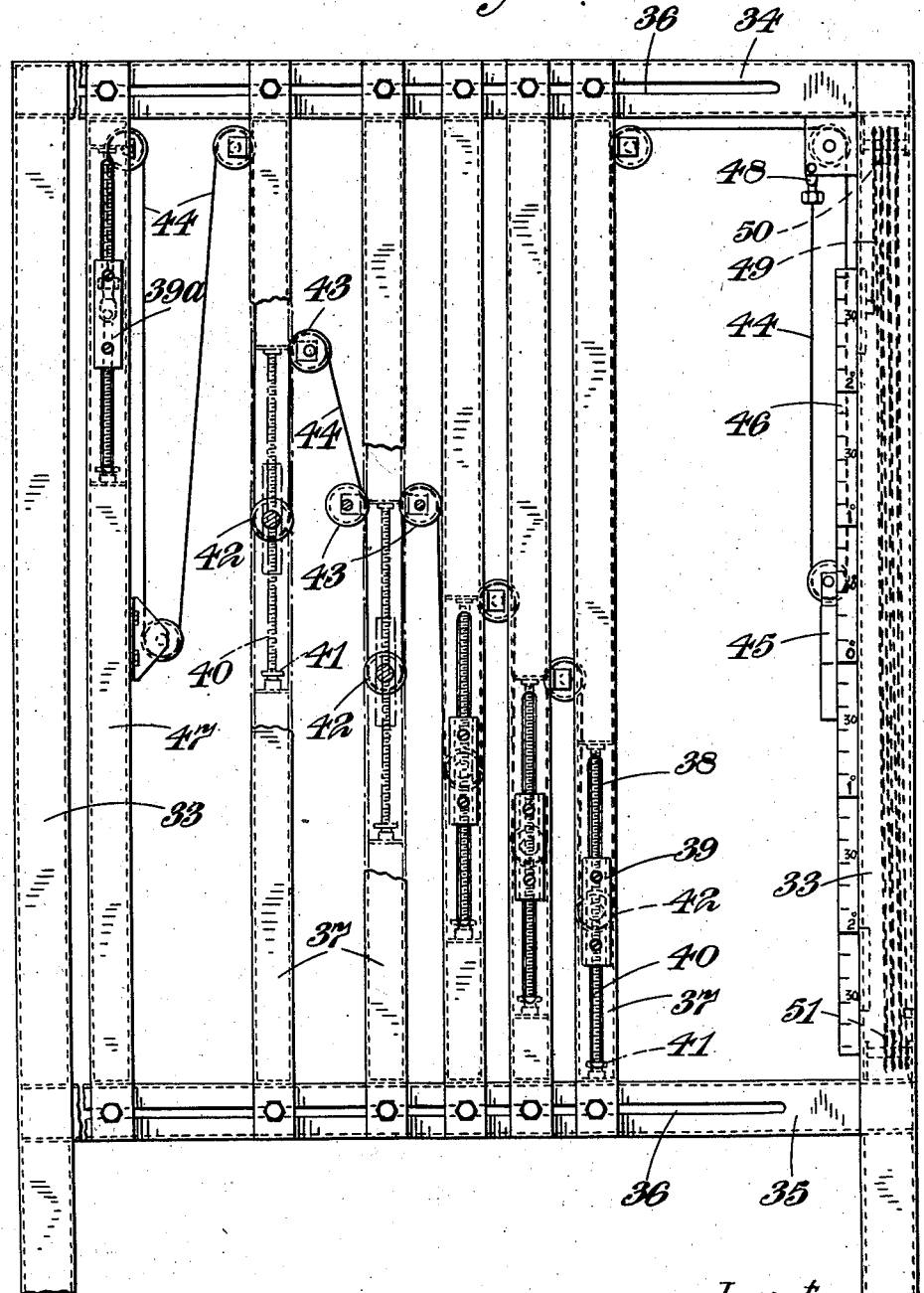

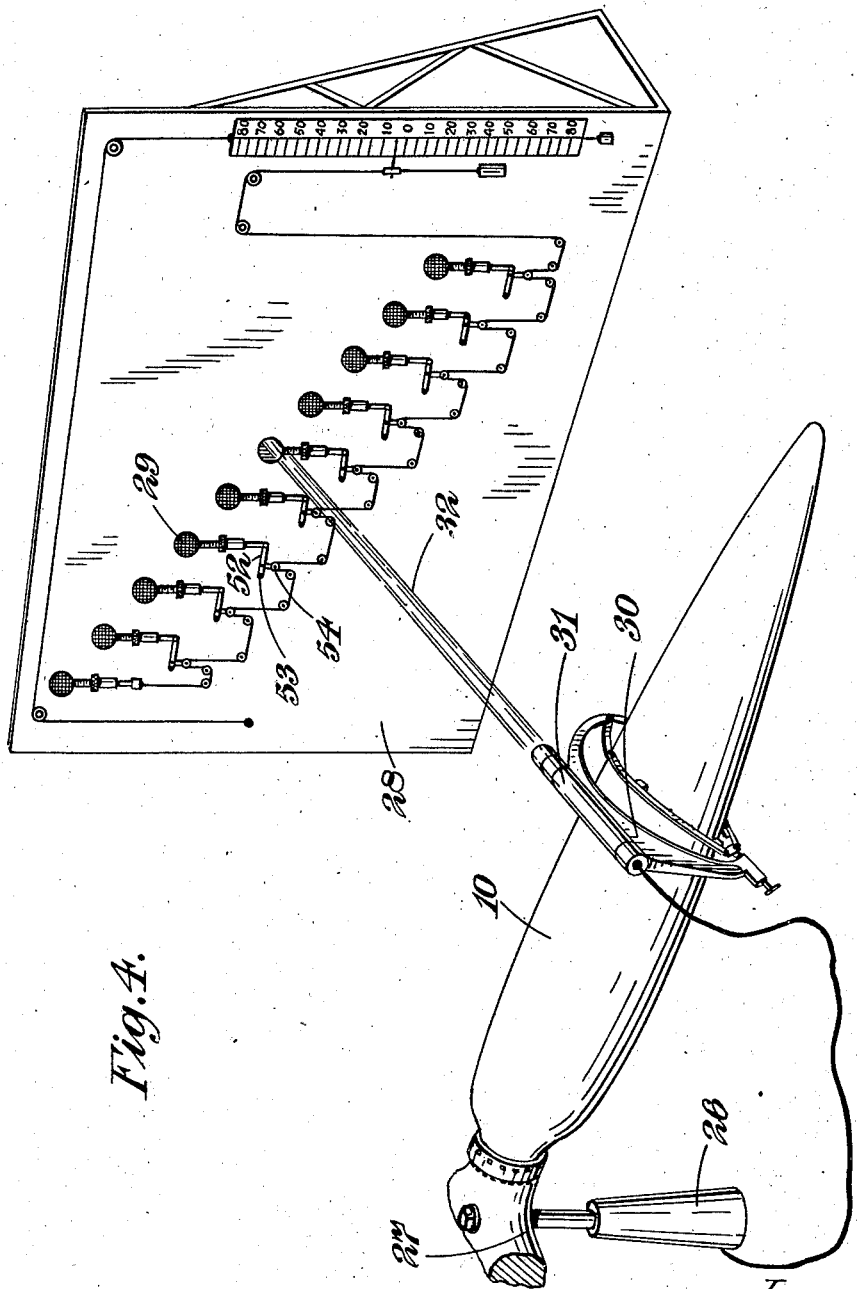

Patented May 28, 1946

2,400,942

UNITED STATES PATENT OFFICE 2,400,942

AERODYNAMIC BALANCING OF AIRSCREWS OR LIKE ROTATING BODIES

Harry Lawley Milner, Cheltenham, England, assignor to Rotol Limited, a British company Application October 31, 1942, Serial No. 464,088
In Great Britain March 18, 1942

18 Claims. (Cl. 88—24)

In the specification of my application for patent Serial No. 464,086, filed October 31, 1942, I described a method for effecting the aerodynamical balancing of an airscrew which consisted essentially in adjusting the pitch of the various blades so as to ensure that all of them generate equal thrust-moments about the axis of the airscrew. For this purpose the method comprised the steps of (a) measuring the differences in form and/or dimensions from those of a master blade, (b) assessing the thrust-moment produced by such differences (c) calculating the pitch-setting of the master-blade which would produce an equal thrust-moment and (d) applying such calculated pitch-setting as a correction to the setting of the blade in question.

The object of this invention is to provide an apparatus for carrying out this method including the step of calculating the pitch-angle which is to be applied as the correction.

Using the same symbols as in my prior specification aforesaid, where $C$ = chord of the section
$x$ = the radius of the section
$\theta$ = the angular change in the position of the no-lift line, or error, the change in thrust-moment of an element due to a change in the blade-angle is approximately a function of $C.x^3.\delta x.\delta \theta$. In the case of the master blade $\delta \theta$ is assumed to be zero at all sections, but for the blade under examination the actual blade-angles may contain small errors, $\delta \theta$, and the total change in thrust-moment becomes a function of $\Sigma C.x^3.\delta x.\delta \theta$.

This invention, therefore, comprises apparatus for determining the requisite pitch-setting of an airscrew-blade by the method above-described, comprising a chart whereon is plotted the angles of the zero-lift lines of a master blade at a plurality of stations spaced along the blade, means for mounting the blade under examination in a datum angular setting spaced from and parallel with the base-line of said chart, whereby the corresponding zero-lift lines of the blade should, when extended, register with the plotted points, means for projecting the said lines to intersect said chart, means at each station on the chart movable by the amount of any observed deviation from the plotted point, and means whereby such movements are automatically integrated in the form $\Sigma C.x^3.\delta x.\delta \theta$, and the integration exhibited on a scale.

Preferably the apparatus comprises a gauge as described in the specification of my application for patent Serial No. 464,087, filed October 31, 1942, and optical means for projecting the angular setting of the gauge on to the chart or screen.

According to another feature of this invention, therefore, it comprises apparatus as above set forth wherein the integrating means comprises a plurality of targets on the chart, which are set initially to positions thereon in accordance with the zero-lift lines at various stations along a master blade and which are adjustable to the corresponding positions for the blade under test, a pulley operatively connected to each target to be moved by the adjustments thereof, a flexible cord guided over said pulleys in such manner that the movement of its free end indicates the summation of the adjustment of all the pulleys.

It will be appreciated that the quantity $C.x^3.\delta x$ varies for every station along the blade and this invention provides alternative means for taking it into consideration in the calculation. In one form of the invention it is pre-calculated, as hereinafter described, so as to be of a known and preferably equal value at each station, by selection of the radial spacing of the stations, and in the alternative form of apparatus the necessary adjustment is made in the integrating apparatus as hereinafter described.

According to another feature of the invention, therefore, the apparatus is so arranged that the adjustment of each pulley effects a movement of the cord proportional to $C.x^3.\delta x.\delta \theta$ for that station as hereinbefore defined.

According to another feature of this invention, the stations on the blade are spaced longitudinally thereof at such radial distances from the axis of the airscrew that the value of $C.x^3.\delta x$ is the same for all of them.

According to yet another feature of this invention, the spacing of the stations may be modified in that the end station, for example, the radially innermost station, is selected such that its value of $C.x^3.\delta x$ is half that for the other stations, for the purpose hereinafter described.

In an alternative form of the invention, the integrating mechanism may comprise a pivoted lever at each station on the chart, a connection between each lever and the target of that station, which target is adjustable through the observed discrepancy, a pulley carried by each lever at a distance from its pivotal axis proportional to the value of $C.x^3.\delta x$ for that station, a flexible cord guided over all of said pulleys in such manner that the sum of the movement of all the pulleys is imparted to the free end of the cord and indicated on a scale.

Other details of the invention concerned with the mechanical construction of the apparatus will be hereinafter described in detail and the novel features pointed out in the claims appended to this specification.

In the accompanying drawings—

Figure 3 is an elevation showing more or less diagrammatically one form of chart and integrating apparatus, and Figure 4 is a perspective view showing an alternative form of chart and integrating apparatus, and also including the general layout of the blade under test with a gauge thereon, and its relation to the chart.

Figures 1, 2:
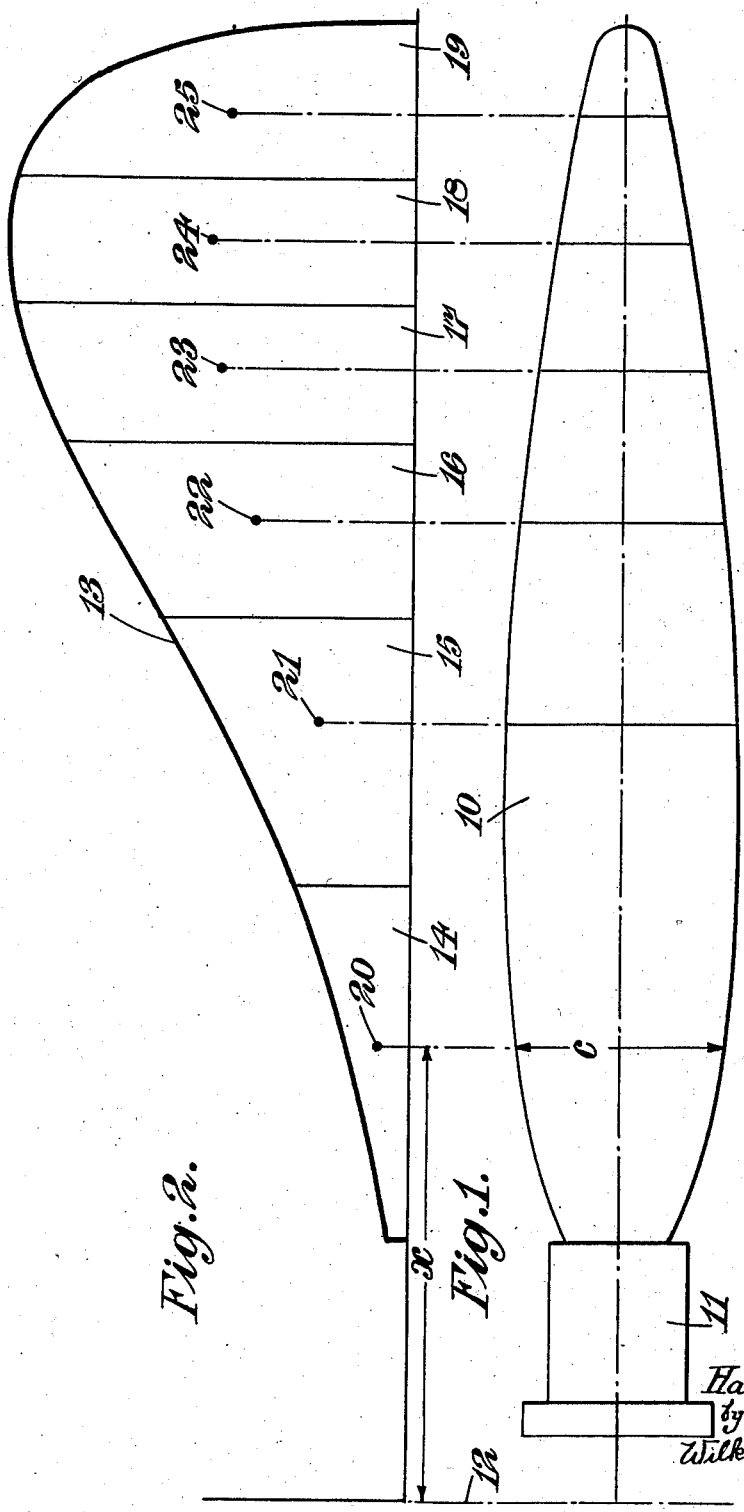
Figure 1 is a diagrammatic representation of an airscrew blade.
Figure 2 is a graph in which $C.x^3$ is plotted against $x$ for the blade of Figure 1.

Referring first to Figures 1 and 2, the blade of an airscrew is indicated at 10 being mounted in an adaptor 11 whereby it is secured in an airscrew hub whereof the axis of rotation is indicated at 12.

Figure 2 shows a graph 13 in which the value of $C.x^3$ is plotted as ordinates against $x$ for a master blade, this plotting being effected in any convenient manner by utilising any desired number of stations along the blade. This calculation is made from the designed drawing of the blade, and the total area enclosed between the graph and the x-axis represents the quantity $\Sigma.C.x^3.\delta x$ for that particular design of blade.

For use with the first-described form of apparatus, which is illustrated in Figure 3 and will be more fully described hereinafter, the graph 13 is used to determine the positions of the stations along the blade at which observations are being made. For this purpose, the total area enclosed by the graph is determined and it is divided into a number of separate areas indicated at 14, 15, 16, 17, 18, 19, whereof the areas 15 to 19 are all equal and the area 14 is equal to a half of each of the others. In the particular case illustrated, these separate areas are defined so that the area of the part 14 is $1/11$ of the total and the area of each of the other parts is $2/11$ of the total. Obviously the total area may be divided into any desired number of parts according to the number of stations at which it is considered desirable observations should be made of a blade being tested, maintaining only the condition that the end-most area is a half of each of the other areas.

The centre of gravity of each of the part-areas is determined, as shown at 20, 21 . . . 25, and these points are projected on to the x-axis to determine the radial distance from the axis of rotation of the airscrew at which observations are to be made. These radial distances are shown projected on to the blade of Figure 1, and it will be understood that for each of the stations 21 to 25 on the blade the quantity $C.x^3.\delta x$ is the same, but for the station 20 this quantity is a half of $C.x^3.\delta x$, for the purpose hereinafter described.

The general arrangement of the apparatus is illustrated in Figure 4 and it comprises any suitable form of stand 26 provided with means 27 for receiving an airscrew blade 10. The device 27 must accurately locate the blade so that its longitudinal axis is parallel with and spaced at a predetermined distance from a chart 28, and must also locate it angularly about its own axis, and for this purpose a locking detent is preferably provided on the part 27 to engage a suitable part of the adaptor or root end of the airscrew blade to hold it in a selected pitch position; any convenient datum line can be used for this purpose but preferably it is the line ordinarily used for measuring the pitch-setting of a blade, namely that of the flat face of the blade at a section 0.7 of its radius towards its tip, and all angular measurements are made from this line.

The measurement which it is required to make at each station along the blade is the inclination of the zero-lift line at the station to the datum line aforesaid, in order to compare it with the corresponding angle for the designed or master blade and discover any error for which correction is required.

For the purposes of the test there are arranged on the chart a series of "targets" 29 which are spaced along the x-axis of the chart at the points corresponding to the various stations on the blade, and are spaced along the y-axis at such heights as to subtend the angle of the zero-lift line which is measured on the blade at each station.

The targets 29 are, in the first instance, set at positions corresponding to the angles of the designed zero-lift lines at the various stations when the flat face of the blade at 0.7 radius is set at some arbitrarily selected position. This may be, for example, horizontal but in order to give a spacing of the zero-lift positions on the chart on each side of the datum line, it may be set, say 5°, below the horizontal, thereby reducing or eliminating errors in the angular measurements.

When the blade under examination has been placed in position with the flat face at the selected station in the datum setting, a device such as that described in my co-pending application Serial No. 464,087, filed October 31, 1942, is used to measure the direction of the zero-lift lines thereof, and this device is provided with an optical means for projecting these lines or lines parallel thereto, on to the appropriate targets. As illustrated, the base of the measuring device 30 is provided with an optical projector 31 of which the optical axis is parallel with the base-line and it is arranged to throw a pencil of light 32, preferably a parallel or slightly tapering pencil, on to the chart 28. It will be obvious that other optical devices may be used, such, for example, as a telescope or like sighting device, through which the target 29 can be viewed. The measuring device 30 is set to the various stations along the blade at each of which a measurement is to be made and such measurement is projected on to the chart 28. If the section of the blade under examination shows any discrepancy from the correct angle, the target 29 is adjusted from its initial correct position to the point corresponding to the angle of that section. This adjustment is a measure of the discrepancy between the test blade and the designed or master blade, and it is further required to weight the values thus measured according to their importance from the thrust-moment point of view, and finally to integrate such weighted values; a feature of this invention consists in the arrangements whereby the readings taken at all the stations are thus integrated so that a final indication is given of the value $\Sigma C.x^3.\delta x.\delta\theta$ for the complete blade.

Various arrangements of chart can be used for this purpose and the preferred one is illustrated in Figure 3.

Referring to this figure, the chart comprises a rectangular framework having vertical standards 33 and horizontal bars 34, 35 at the top and bottom, respectively. These bars 34, 35 are slotted at 36 or otherwise so formed as to receive adjustably in them a series of vertical bars 37 which can be spaced along the base 35 of the chart at any desired stations. These bars 37 are themselves slotted or otherwise formed at 38 to receive blocks 39 adjustable in a vertical direction on them, and these blocks constitute the targets aforesaid. Preferably the blocks 39 are free to slide in the slots 38 under the control of screw-threaded spindles 40 which are individually rotatable by means of knurled heads 41 so that a very accurate adjustment of the position of a target can be effected. They may be marked in any convenient manner to co-operate with the light-pencil 32 aforesaid, or the visual observation, to give the required accuracy of measurement. Each of the blocks 39 carries a pulley 42, and suitable guide-pulleys 43 are mounted on the bars 37 to guide a flexible cord 44 on to the pulleys 42 in parallel or substantially parallel lays. One end of the cord 44 may be fixed and at the other end there is supported a pointer 45 which moves over a scale 46 calibrated in degrees and fractions of a degree so as to give a direct reading of the pitch-adjustment which is required to be applied to the blade under examination to provide for its correct aerodynamical balancing. This correction is applied to the angular setting of the flat face of the blade constituting the datum line aforesaid (i. e. the flat face at 0.7 radius), so that any errors in the datum line itself, or in its setting with respect to the chart are automatically included and corrected.

As has been explained above, the correction to be applied is the summation $\Sigma C.x^3.\delta x.\delta \theta$, and of this quantity the factor $\delta \theta$ is measured by the adjustment consisting of the movement of the target from its correct position to the position indicated by the device 30, 31; this angle, however, has to be weighted according to the station, by the quantity $C.x^3.\delta x$, and, as explained above, by selecting suitable values of $x$, this quantity may be made uniform for all of the stations. It is for this reason that the bars 37 are adjustable horizontally along the target so that they lie at the appropriate stations.

The flexible cord 44 is preferably a thin bronze strip about 0.004 inch in thickness which is found to be sufficiently flexible to pass around the pulley system without offering undue resistance whilst at the same time it is sufficiently strong to be uninfluenced by other factors, except temperature, and the temperature-changes are compensated in the manner hereinafter described.

In order to reduce the number of pulleys and consequent friction, the station at the radially innermost end of the blade at which the bar 47 (at the left-hand end) is mounted, is provided with a target block 39a which does not carry a pulley but has the end of the flexible cord 44 secured to it. It will be seen, therefore, that movement of the target 39a imparts to the indicator 45 only one-half of the movement which would be imparted to it by an equal adjustment of any of the other targets, and for this reason the spacing of the stations is adjusted in the manner hereinbefore described to give the correct weighting to the value of $\delta \theta$ at the station 39a.

The flexible cord 44 is, therefore, fixed at one end to the target 39a and in the form illustrated its other end 48 is anchored to the frame 33, with the indicator 45 suspended in a bight of the cord. Obviously, the cord could terminate at the indicator 45, in which case a more open scale 46 would be obtained and the pulley on the indicator could be omitted.

In order to provide compensation for temperature-changes causing expansion and contraction of the cord 44, the scale 46 is supported by a cord 49 made of the same material as the cord 44 and of an equal length, this cord being guided around a series of pulleys 50, 51 so that any movement of the indicator 45, due to a change in temperature, is accompanied by an equal movement of the scale 46, thereby keeping the reading on that scale unaltered.

The indicator 45 and the member carrying the scale 46 are preferably made of sufficient weight to provide such tension on their respective flexible cords as will ensure uniform working of the apparatus and preferably these tensions are equal.

In Figure 4 there is illustrated diagrammatically an alternative form of integrating mechanism on the chart 28. In this case each of the targets 29 is connected to a lever 52 pivoted at 53 on the chart, and the various pulleys 54 are spaced differently along their respective levers so as to give the necessary weighting to the measured angles $\delta \theta$ by which the respective targets are moved. In this case the stations along the blade at which the readings are taken may be spaced equally or in any other arbitrary manner and the value $C.x^3.\delta x$ for each station is pre-calculated and the pulley 54 is spaced at a distance from the pivot of its lever at a distance appropriate to the value $C.x^3.\delta x$ for that station. In other respects the construction of the integrating mechanism in Figure 4 is similar to that indicated in Figure 3.

In using either form of apparatus hereinbefore described, the blade may be marked with the positions at which the indicating device 30, 31 is to be applied to it, or, alternatively, the blade may be mounted adjacent a table or gauge carrying indicators or positioning blocks or the like against which the device can be placed, thereby considerably facilitating the whole operation.

The construction of chart and integrating mechanism described with reference to Figure 3 is preferred, as providing a simpler operation than that of Figure 4, since the vertical bars 37 can be very readily adjusted to deal with blades of different design, whereas in the construction illustrated in Figure 4, the adjustment required is that of the ratios of each of the lever-arms 52 which is not such a simple operation.

I claim:

1. Apparatus for determining the requisite pitch-setting of an airscrew blade, by the method described, comprising a chart or screen whereon is plotted the designed zero-lift angle as hereinbefore defined, of the blade at a plurality of stations spaced along the blade, means for mounting the blade in a datum angular setting spaced from and parallel with the x-axis of said chart, whereby the corresponding zero-lift lines of the blade should, when extended, register with the plotted points, means for projecting these said lines to intersect said chart, means at each station on the chart movable by the amount of any observed deviation from the plotted point, and means whereby such movements are automatically integrated in the form $C.x^3.\delta x$ and the integration exhibited on a scale, where C is a chord of the blade section, and $x$ is a radius of that section.

2. Apparatus according to claim 1, comprising a gauge, an optical means for projecting the angular setting of the gauge on to the chart or screen.

3. Apparatus according to claim 1, wherein the integrating means comprises a plurality of targets on the chart which are set initially to positions thereon in accordance with the zero-lift lines at various stations along a master blade and which are adjustable to the corresponding positions for the blade under test, a pulley operatively connected to each target to be moved by the adjustment thereof, a flexible cord guided over all of said pulleys in such manner that the movement of its free end indicates the summation of the adjustment of all the pulleys.

4. Apparatus for determining the requisite pitch-setting of an airscrew blade by the method described, comprising a chart or screen whereon is plotted the designed zero-lift angle as hereinbefore defined, of the blade at a plurality of stations spaced along the blade, means for mounting the blade in a datum angular setting spaced from and parallel with the x-axis of said chart whereby the corresponding zero lift lines of the blade should, when extended, register with the plotted points, means for projecting said lines to intersect said chart, means at each station on the chart movable by the amount of any observed deviation from the plotted point, means whereby such movements are automatically integrated in the form $C.x^3.\delta x$ and the integregation exhibited on a scale, where $C$ is a chord of the blade section, and $x$ is a radius of that section, a gauge, optical means for projecting the angular setting of the gauge on to the chart or screen, said integrating means comprising a plurality of targets on the chart which are set initially to positions thereon in accordance with the zero-lift lines at various stations along a master blade and which are adjustable to the corresponding positions for the blade under test, a pulley operatively connected to each target to be moved by the adjustment thereof, a flexible cord guided over all of said pulleys in such manner that the movement of its free end indicates the summation of the adjustment of all the pulleys, the adjustment of each pulley effecting a movement of the cord proportional to $C.x^3.\delta x.\delta\theta$, where $C$ is the chord of the blade section, $x$ is the radius of the blade section and $\delta\theta$ is the angular error in the position of the zero-lift-line of the blade.

5. Apparatus according to claim 4 wherein the stations on the blade are spaced longitudinally thereof at such radial distances thereon that the value of $C.x^3.\delta x$ is the same for all of them.

6. Apparatus according to claim 4 wherein the stations on the blade are spaced longitudinally thereof at such radial distances thereon that the value of $C.x^3.\delta x$ is the same for all of them and the spacing of the end station, for example the radially innermost station, is selected such that its value of $C.x^3.\delta x$ is a half that for the other stations.

7. Apparatus according to claim 4 wherein the integrating mechanism comprises a pivoted lever at each station, a connection between each lever and the target at each station, which target is movable through the observed deviation of the test blade, a pulley carried by each lever at a distance from its pivotal axis proportional to $C.x^3.\delta x$ for that station, a flexible cord guided over all of said pulleys in such manner that the sum of the movement of the pulleys imparted to the free end of the cord is measurable on a scale.

8. Apparatus according to claim 4, wherein there is provided temperature-compensation for the indicator and its co-operating scale.

9. Apparatus according to claim 4 wherein tension is applied to the working cord or cords.

10. In apparatus for determining the requisite pitch-setting of an airscrew-blade, the combination of a blade-supporting socket, a screen spaced from and parallel with the longitudinal axis of said socket, means for determining the direction of the zero-lift line at each of a number of sections of the blade, means for projecting these lines on to said screen, a plurality of targets adjustably mounted on said screen, means for aligning said targets with said zero-lift-line-projections, a pointer and a scale, and means interconnecting said targets with said pointer to cause it to register the integration of adjusting movements imparted to said targets.

11. In apparatus for determining the requisite pitch-setting of an airscrew-blade, the combination of a blade-supporting socket in which the blade can be held at a predetermined angular setting, a screen spaced from and parallel with the longitudinal axis of said socket, a plurality of targets adjustably mounted on said screen, an adjustable pointer, a scale cooperating with said pointer, means for determining the direction of the zero-lift line of each of a number of sections of the blade corresponding to the number of targets, optical means for projecting said lines towards said targets, means for aligning said targets with their respective lines and integrating means connecting said targets and said pointer whereby the pointer registers a pitch-correction-angle corresponding to the adjustments of said targets.

12. In apparatus for testing an airscrew-blade, the combination of a blade-supporting socket, a screen spaced from the parallel with the longitudinal axis of said socket, a plurality of targets adjustable on said screen to predetermined positions, a scale, an adjustable pointer moving over said scale, a gauge for determining the direction of the zero-lift line of a section of the blade, optical means projecting a beam of light on to said screen in accordance with the setting of the gauge, means for adjusting each of said targets into co-incidence with the beam of light determined by said gauge for each of a plurality of stations, and means interconnecting said targets and said pointer to move said pointer in accordance with the summation of the adjustments of the said targets.

13. In apparatus for determining the requisite pitch-setting of an airscrew-blade, the combination of a blade-supporting socket, a blade mounted at a predetermined angular setting therein, a gauge adjustable along said blade to a plurality of stations and indicating the direction of a zero-lift-line of the blade-section at each station, optical means on said gauge indicating the direction of said zero-lift-lines on said screen, a plurality of targets on said screen, means for adjusting each target individually into register with a projected zero-lift-line thereon, a scale on said screen, a pointer moving over said scale, and means interconnecting said targets and said pointer imparting thereto the integration of the adjustments of said targets from a predetermined setting.

14. In apparatus for determining the requisite pitch-setting of an airscrew-blade, the combination of a blade-supporting socket, a screen spaced from and parallel with the longitudinal axis of said socket, a plurality of targets mounted on said screen, a scale, a pointer movably over said scale, means for determining the zero-lift-line of a number of sections corresponding to the number of targets, means for projecting said line towards said targets, means for aligning said targets with said zero-lift-line, a pulley operatively connected to each target and movable therewith, a flexible cord guided over all of said pulleys and connected to said pointer.

15. In apparatus for determining the requisite pitch-setting of an airscrew-blade, the combination of a blade-supporting socket, a blade secured therein at a predetermined angular setting, a screen spaced from and parallel with the longitudinal axis of said blade, a plurality of targets adjustably mounted on said screen, a plurality of levers pivotally mounted on said screen allocated one to each target and movable by adjusting movements thereof, a pulley carried by each of said levers, a flexible cord guided over all of said pulleys, a pointer connected to said cord and a scale over which said pointer moves.

16. In apparatus for determining the requisite pitch-setting of an airscrew-blade, the combination of a blade-supporting socket, a screen spaced from and parallel with the longitudinal axis of said socket, a plurality of targets adjustable on said screen, a pulley carried by each of said targets, a flexible cord guided over all of said pulleys, a pointer carried by said cord, means for tensioning said cord, and a scale adjacent said pointer.

17. In apparatus for determining the requisite pitch-setting of an airscrew-blade, the combination of a blade-supporting socket, a screen spaced from and parallel with the longitudinal axis of said socket, a plurality of targets adjustable on said screen, a pulley carried by each of said targets, a flexible cord guided over all of said pulleys, a pointer carried by said cord, means for tensioning said cord, a scale supported on said screen by a flexible cord having the same thermal expansion as said first-mentioned cord, co-operating with said scale.

18. In apparatus for determining the requisite pitch-setting of an airscrew-blade, the combination of a blade-supporting socket, a screen spaced from and parallel with the longitudinal axis of said socket, a plurality of bars mounted on said screen at right-angles to the axis of said socket, means for adjusting said bars transversely of their length, a target carried on each of said bars, means for adjusting each target lengthwise of its bar, means for determining the direction of the zero-lift-line of each of a number of sections of the blade corresponding to the lateral spacing of said targets, optical means for projecting said zero-lift-lines towards said targets, a pulley movable with each of said targets, a flexible cord passing over all the said pulleys, a pointer connected to said cord, and a scale co-operating with said pointer.

HARRY LAWLEY MILNER.